United States Patent [19]

Feller et al.

[11] 4,250,779

[45] Feb. 17, 1981

[54] APPARATUS FOR MAKING OUT-OF-ROUND WORKPIECES

[75] Inventors: Otto Feller, Leichlingen; Manfred Kühl, Leverkusen-Rheindorf; Alois Skrobek, Burscheid, all of Fed. Rep. of Germany

[73] Assignee: Goetze AG, Burscheid, Fed. Rep. of Germany

[21] Appl. No.: 924,732

[22] Filed: Jul. 14, 1978

[30] Foreign Application Priority Data

Jul. 18, 1977 [DE] Fed. Rep. of Germany ....... 2732354

[51] Int. Cl.³ ............................................. B23S 5/24
[52] U.S. Cl. .......................................... 82/18; 82/2 B; 82/21 B
[58] Field of Search ................. 82/18, 19, 1.3, 1.4, 82/2 B, 2 D, 21 B

[56] References Cited

U.S. PATENT DOCUMENTS

| 2,932,227 | 4/1960 | Koch et al. | 82/19 |
| 3,754,178 | 8/1973 | Dormehl et al. | 82/2 B |

FOREIGN PATENT DOCUMENTS 1043015 11/1958 Fed. Rep. of Germany.
1045204 11/1958 Fed. Rep. of Germany.
2006760 8/1971 Fed. Rep. of Germany.

Primary Examiner—Leonidas Vlachos
Attorney, Agent, or Firm—Spencer & Kaye

[57] ABSTRACT

An apparatus for the non-circular peripheral machining of an out-of-round workpiece includes a lathe spindle for rotating the workpiece; a radially displaceable tool holder for carrying a tool to engage a peripheral face of the workpiece; a first and a second setting motor for displacing the tool holder in a radial direction during rotation of the lathe spindle; a first connecting device coupling the output of the first setting motor with the second setting motor and the tool holder for displacing, with incremental steps, the second setting motor and the tool holder as a unit in the radial direction; and a second connecting device coupling the output of the second setting motor with the tool holder for displacing, with incremental steps—that are of different magnitude from those of the first setting motor—the tool holder in the radial direction relative to the first connecting device and the first setting motor.

11 Claims, 6 Drawing Figures

APPARATUS FOR MAKING OUT-OF-ROUND WORKPIECES

BACKGROUND OF THE INVENTION

This invention relates to an apparatus for the peripheral machining of out-of-round workpieces, particularly piston rings and is of the type that includes a lathe having at least one radially displaceable tool, or, as the case may be, tool holder and at least two setting motors for controlling the tool displacement.

For the peripheral machining of piston rings having out-of-round inner and outer circumferential faces, apparatuses are known which essentially correspond to a lathe. The piston rings which, as a rule, are axially clamped together to form a stack, are simultaneously machined on their outer and inner faces as disclosed, for example, in German Pat. No. 1,045,204. The tools are mounted at the ends of pivotally secured tool holders and their radial displacement is controlled by a cam which rotates synchronously with the lathe spindle. Further, German Pat. No. 1,043,015 discloses an adjustable dual level system for controlling the tool for the non-circular (out-of-round) machining of piston rings.

Based on the requirement that a piston ring in its installed state should lie along its entire circumference with a defined radial pressure distribution against the cylinder wall in a "light slit tight" manner, the principal problem has resided for many years in the construction of the duplicating (copying) cam. In earlier days the manufacture of a copying cam has been effected by handcrafting: the out-of-round piston ring with nominal diameter was cut through at a circumferential location, then spread with the desired tangential force and thereafter the thus obtained out-of-round contour was transferred to a master cam. More recently attempts have been made to determine the out-of-roundness of the copying cam mathematically by calculating the individual polar coordinates by means of an electronic computer.

In the meantime, various control systems such as NC-controls and CNC-controls have been developed within the framework of the progressing automation of work tool machines, particularly lathes. While in case of an NC-control the data are applied by means of a punch tape to the control system of the machine tool, in case of a CNC-control, the control values are directly applied from the memory of an electronic computer to the control system of the machine tool. This latter system further ensures a continuous adjustment of the control values by comparing, with the aid of measuring devices, the actual values with the predetermined desired values. Such electronic control systems are widely used in modern lathes, particularly copying lathes.

In applications known heretofore, preponderantly round workpieces have been machined. The axial displacement of the tool has been continuous in most cases, while the radial displacements have been either continuous or intermittent. The drive for the work tool holder is constituted by servo-motors, stepping motors and mechanical, pneumatic or hydraulic systems, all known by themselves.

Further, German Offenlegungsschrift (Laid-Open Application) No. 2,006,760 discloses a non-circular turning apparatus for lathes in which the turning tool is displaceable in the radial direction as a function of the angle of rotation of a workpiece which rotates with the lathe spindle. The tool displacement is effected by means of at least two parallel-coupled, juxtapositioned setting motors which are affixed to the machine bed. The displacement values generated by the setting motors are first prepared mechanically in a coupling drive and then are transferred to the tool holder. The degree of accuracy achievable by the numerical electronic control of the setting motors is thus largely lost due to the necessarily present plays and wear in the complex coupling drive.

SUMMARY OF THE INVENTION

It is an object of the invention to provide an improved apparatus for the non-circular (out-of-round) machining of peripheral workpiece faces wherein the radial tool displacement can be controlled electronically synchronously with the rotation of the work spindle and wherein the displacement values can be transmitted from the setting motors to the tool holder in the shortest possible path and further wherein relatively large displacements can be controlled in precise increments within the shortest possible time.

This object and others to become apparent as the specification progresses, are accomplished by the invention, according to which, briefly stated, the apparatus for the non-circular peripheral machining of an out-of-round workpiece includes a lathe spindle for rotating the workpiece; a tool holder displaceable transversely to the rotary axis of the spindle for carrying a tool to engage a peripheral face of the workpiece; a first and a second setting motor for displacing the tool holder in the transverse direction during rotation of the lathe spindle; a first connecting device coupling the output of the first setting motor with the second setting motor and the tool holder for displacing, with incremental steps, the second setting motor and the tool holder as a unit in the transverse direction; and a second connecting device coupling the output of the second setting motor with the tool holder for displacing, with incremental steps—that are of different magnitude from those of the first setting motor—the tool holder in the transverse direction relative to the first connecting device and the first setting motor.

In order to achieve an intended second non-uniform and relatively rapidly oscillating tool displacement, the path to be traveled by the tool has to be divided into a great number of very small steps (increments) and several of these increments can be added in a timed sequence to the desired partial increment. The essence of the invention is thus to be seen in that one setting motor, by means of a relatively large incremental step, effects a basic (coarse) tool displacement, while an additional setting motor effects a "fine tuning" of the tool displacement within the predetermined period by means of relatively small incremental steps. In order to maintain the required degree of accuracy of the tool displacement, the setting motors are directly connected behind one another (i.e. in series), so that the first setting motor moves the second setting motor with the tool holder as a unit in each step, whereas the tool holder is coupled to the output of the second setting motor. By means of this series connection of the setting motors, there is obtained a direct addition of both individual motions so that no additional coupling drive is necessary. The displacement values delivered by the computer are thus transmitted by the shortest and most rapid manner to the tool holder.

According to a particularly simple embodiment, the first setting motor which is fixedly secured to the machine bed, drives a displaceable intermediate body, to which the second setting motor, affecting directly the tool holder, is secured. Preferably, the intermediate body is formed of a slide which is supported on a guide track and which is displaceable transversely to the axis of the lathe spindle.

For adjusting the tool holder to different workpiece diameters while maintaining the out-of-round contour unchanged, according to a further feature of the invention the tool holder is mounted on the slide in such a manner that it is adjustable with respect to the slide and may be immobilized in the adjusted position.

For performing a simultaneous machining of the outer and inner peripheral surfaces of hollow bodies, particularly piston ring stacks, a second tool and tool holder are used. Advantageously, the second tool holder, while it is also mounted on the transversely displaceable slide which carries the first tool holder, is coupled with a third setting motor which is connected with the slide and which effects an additional transverse displacement of the second tool holder. In this manner, it is feasible to make out-of-round hollow bodies, for example, piston ring stacks that have varying radial wall thicknesses as viewed in the circumferential direction.

It is, however, also feasible to mount each tool holder on a separate transversal slide and to support the transversal slides in such manner that they are longitudinally (i.e. parallel to the axis of the lathe spindle) shiftable independently from one another. For this purpose, additional setting motors may be used. By virtue of a separate longitudinal displacement of the tool holder optimum conditions involving the incremental displacements of the workpiece may be achieved.

In accordance with another feature of the invention, the tool holder is designed as a two-arm rocker pivotally mounted on a slide controlled by the first setting motor. One arm of the rocker carries the tool whereas the other arm is connected with the drive shaft of the second setting motor for angularly displacing the rocker and the tool holder in a direction transverse to the axis of the lathe spindle. Preferably, the rocker arms are arranged at an angle of 90° to one another so that the axes of the setting motor shafts intersect at 90° as well. This arrangement provides for a particularly compact structural solution.

For transmitting the rotary motion of the output shaft of the second setting motor to the rocker arm, there is preferably provided a sliding block constituted by a nut member movable in a slot guide of the rocker arm. The nut member supports a threaded spindle of the second setting motor.

According to another feature of the invention, instead of a threaded spindle, the sliding nut may support an eccentric disc affixed to the drive shaft of the second setting motor. The last-named solution is advantageous in that a play-free connection is provided with simple means, further enhancing the requirement for accuracy.

In accordance with a further feature of the invention, for the simultaneous inner and outer machining of hollow bodies, particularly piston rings, there are provided individual tool holders each designed as two-arm rockers, wherein the rockers are preferably driveable by separate setting motors and are displaceable in the longitudinal direction independently from one another.

DESCRIPTION OF THE PREFERRED EMBODIMENTS

Figure 1:
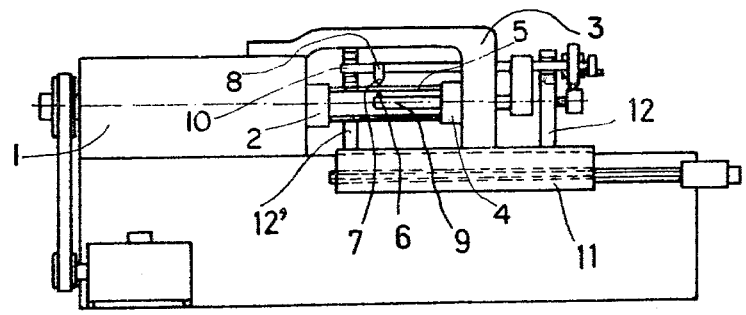
FIG. 1 is a schematic elevational view of a lathe incorporating the invention.

Turning now to FIG. 1, there is schematically shown a lathe for the simultaneous machining of the inner and outer peripheral faces of out-of-round piston rings. The lathe comprises a head stock 1 having a rotatably supported spindle 2 and a counter yoke 3 supporting a rotatable socket 4, to which a piston ring stack 5 may be axially clamped. The tools 6 and 7 for the respective inner and outer machining of the piston ring stack are connected with a pivotal rocker bar 10 by means of an arm 8 or, respectively, an axial rod 9. The rocker bar 10 is supported on two posts 12 and 12' affixed to a longitudinally displaceable slide 11.

Figure 2:
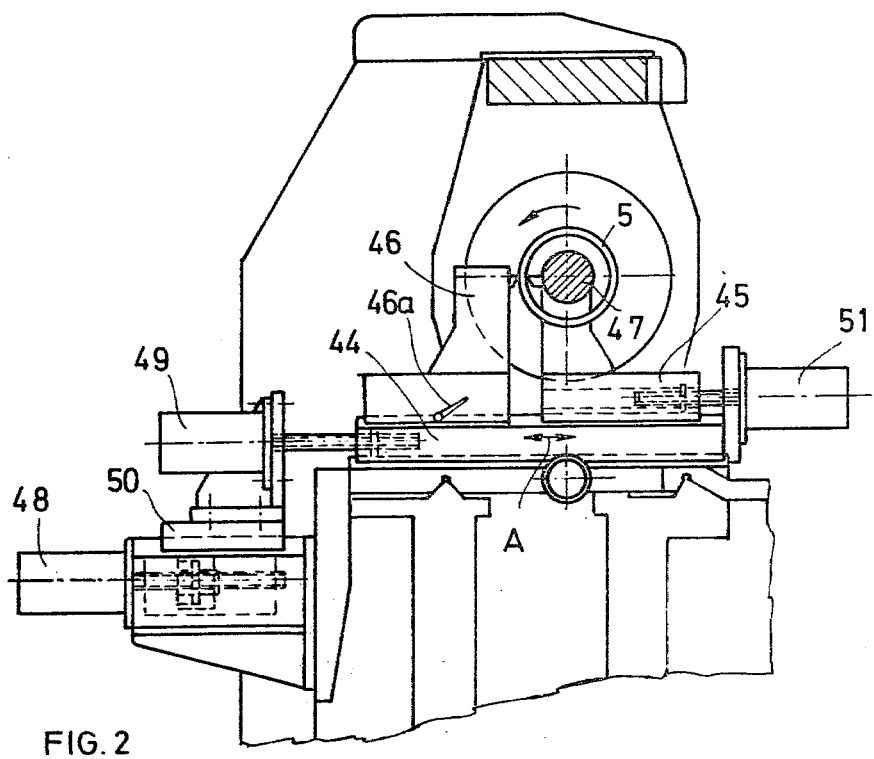
FIG. 2 is a schematic side elevational view of a preferred embodiment of the invention.

Turning now to FIG. 2, there is illustrated, in side elevation, a preferred embodiment of the invention. The apparatus has two tool holders 46 and 47 mounted on a transversely movable slide 44 for supporting the respective tools for the simultaneous inner and outer machining of the piston ring stack 5. The drive of the slide 44 is effected by two setting motors 48 and 49 the outputs of which are connected in series with the intermediary of a carrier slide 50. The latter supports the second setting motor 49, while the first setting motor 48 is mounted on the machine frame and, by means of a spindle drive, linearly displaces the carrier slide 50. The output shaft of the second setting motor 49, in turn, is connected to the slide 44 for displacing the same in the direction of the double-headed arrow A. For additionally displacing the tool holder 47 (which is constituted by an axial rod), there is provided an additional slide 45 which supports the tool holder 47 and which is displaceable by a third setting motor 51 relative to the transverse slide 44, so that out-of-round workpieces having circumferentially varying radial wall thicknesses may be manufactured. Further, for adjusting the tool holder 46 to different workpiece diameters while maintaining the out-of-round setting unchanged, the tool holder 46 is adjustable transversely to the lathe spindle axis (which is perpendicular to the drawing plane of FIG. 2) by shifting it manually on and with respect to the slide 44. A releaseable lock 46a serves for immobilizing the tool holder 46 on the slide 44.

The displacement of the slide 44 (and at least that of the tool holder 46) transversely to the lathe spindle axis is thus the sum of the transverse displacement effected indirectly by the first setting motor 48 (causing displacement of the slide 50) and the transverse displacement effected directly by the second setting motor 49.

Figure 3:
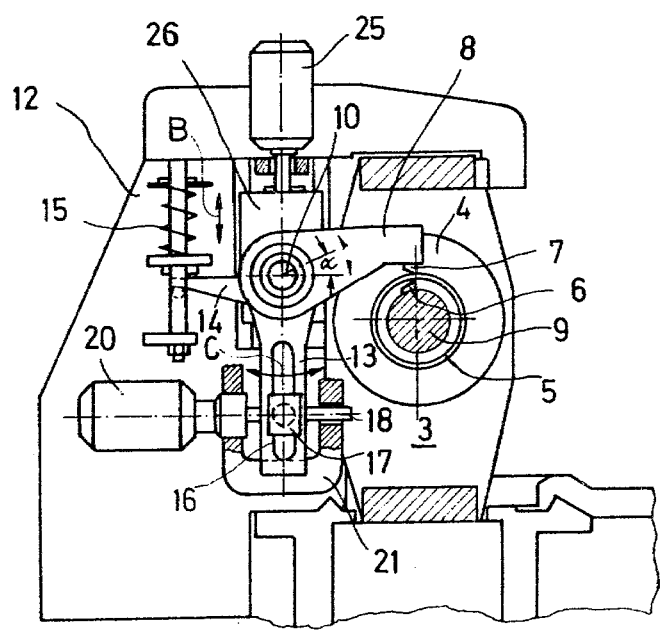
FIGS. 3 and 3a are schematic side elevational views of two further preferred embodiments of the invention.

FIG. 3 illustrates another preferred embodiment of the apparatus according to the invention. The tool 7 for machining the outer periphery of the piston ring stack 5 is held in a tool holder arm 8 affixed to a rocker shaft 10 which extends parallel to the lathe spindle and which is mounted on a slide member 26. The latter is displaceable linearly in the direction of the double-headed arrow B by means of a first setting motor 25. The rocker shaft 10 is displaced as a unit with the slide member 26 and this linear displacement is also performed by the rocker arm 8. As a result, the first setting motor 25 causes a radial displacement of the tool 7 with respect to the rotary axis of the workpiece 5.

A second setting motor 20 is mounted on a carrier member 21 which, in turn, is an integral part of the slide member 26. Thus, the second setting motor travels in the direction of the double-headed arrow B as a unit with the slide member 26 when the latter is displaced by the first setting motor 25.

The output shaft 18 of the second setting motor 20 threadedly engages a traveling nut 17 which is held in a longitudinal slot 16 of an arm 13. The latter is affixed to the rocker shaft 10, so that when the traveling nut 17 is driven by the second setting motor 20 along its output shaft 18, the rocker arm 13 is displaced angularly in the direction of the double-headed arrow C and thus causes a rotation of the rocker shaft 10 through an angle $\alpha$. This angular motion of the rocker shaft 10, in turn, causes a similar displacement of the tool carrying arm 8 and thus, as a result, the tool 7 is displaced radially with respect to the rotary axis of the workpiece 5. It is seen that in this embodiment too, the radial displacement of the tool 7 is the sum of the displacements caused by the first setting motor 25 and the second setting motor 20. In this embodiment, the first setting motor 25 effects a linear displacement, whereas the second setting motor superposes, to this linear displacement, an angular displacement of the angle $\alpha$.

The embodiment illustrated in FIG. 3 further has a bar 9 which extends within the hollow workpiece (such as a piston ring stack) and wherein an additional rocker arm—which is not seen in FIG. 3—connects the bar 9 with the rocker shaft 10 so that the tool 6 for the machining of the inner peripheral surface of the workpiece 5 executes simultaneously the same motions as the tool 7, in response to the driving action of the first and second setting motors 25 and 20, respectively.

Thus, in the embodiment according to FIG. 3, the tool holder is a two-arm rocker having a rocker arm 8 which carries the tool and a rocker arm 13 which is angularly displaceably connected with the output shaft 18 of the second setting motor 20. To the rocker shaft 10 there is further affixed a lever 14 which is biased by a compression spring 15 and serves for securing a play-free support of the rocker shaft 10.

Figure 3A:
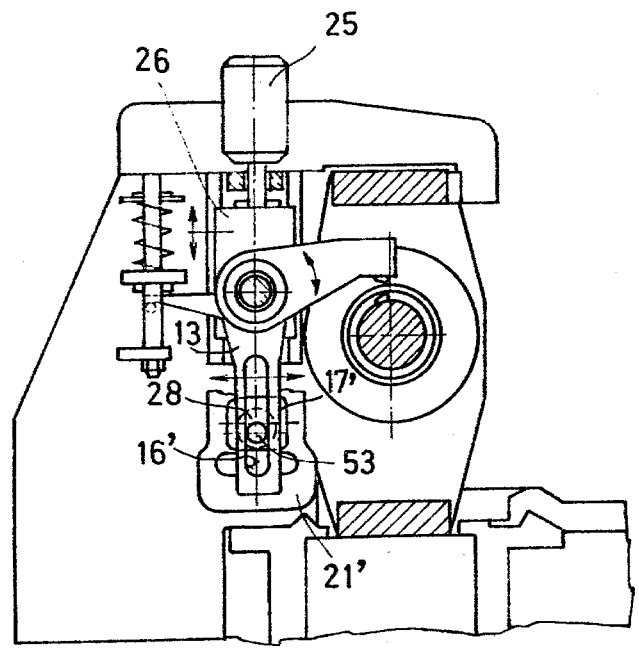

The apparatus illustrated in FIG. 3a corresponds essentially to that described in connection with FIG. 3, except that instead of a threaded traveling nut, there is provided an eccentric disc 28 which is rotatably supported within a correspondingly shaped sliding block 17'. By virtue of this arrangement, the second setting motor is offset 90° with respect to its position shown in FIG. 3 and thus extends perpendicularly to the sheet of the drawing behind the transverse member 21' connected with the slide 26, so that in the drawing only the radial end face of the drive shaft 53 of the second setting motor is visible.

Figure 4:
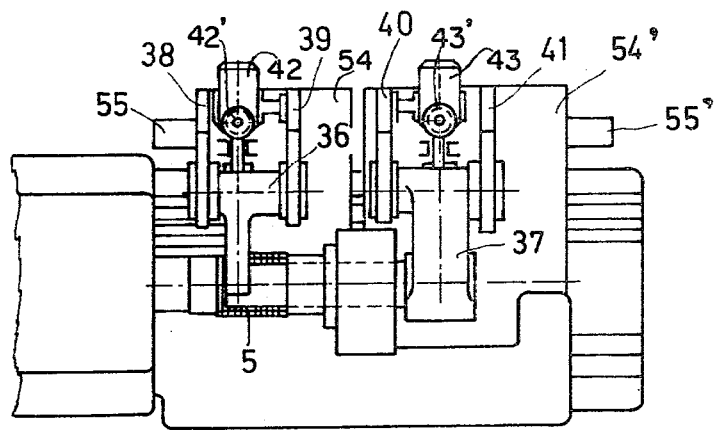
FIG. 4 is a schematic top plan view of still another preferred embodiment of the invention.

Turning now to FIG. 4, there is shown in plan view a further embodiment of an apparatus designed according to the invention. In this embodiment, in contradistinction to the lathe shown in FIGS. 3 and 3a, the two-arm rockers 36 and 37 constituting the tool holders of the tools for the external and, respectively, internal machining of the piston ring stack 5, can be controlled independently from one another. For this purpose, for the two rocker drives there are provided separate posts 38, 39 and, respectively 40, 41 in which the rockers 36 and 37 are pivotally supported and are driven separately by means of respective first setting motors 42 and 43 and second setting motors 42' and 43'. The latter are arranged perpendicularly to the first setting motors 42 and 43 in an analogous way to the setting motors 20 and 25 shown in FIG. 3. A transverse slide 54 which carries the posts 38, 39 and the transverse slide 54' which carries the posts 40, 41 are driven in a longitudinal direction, that is, parallel to the axis of the lathe spindle, by means of additional setting or servomotors 55 and 55'. The motors 55 and 55' are only symbdically indicated in FIG. 4, since they are located below the transverse members 54 and 54' and thus are not visible.

As explained earlier, the radial displacement of the tool is effected in increments, wherein preferably the first setting motor and the second setting motor are stepping motors of the conventional type and are, for example, so structured that upon command (such as pulses transmitted by a numerical control system) the first setting motor in each step, causes a radial displacement of the tool in relatively large (coarse) increments, whereas the second setting motor which itself is shifted with these relatively large incremental steps, causes a radial displacement of the tool in relatively small (fine) incremental steps.

Figure 5:
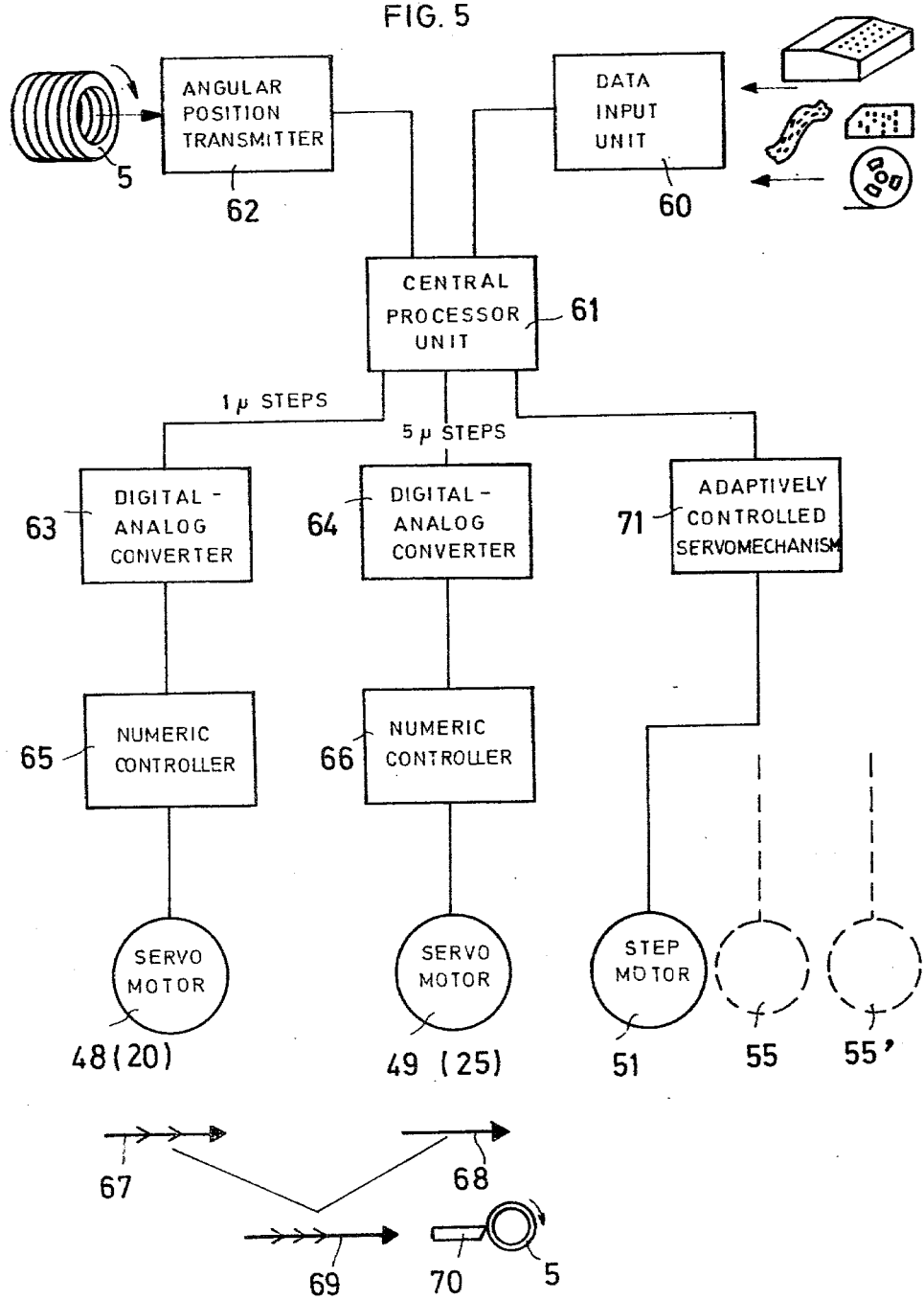
FIG. 5 is a block diagram of a control for the lathe incorporating the invention.

In FIG. 5 there is shown a block diagram of the control system associated with the lathe shown in FIG. 2. By means of the data input unit 60 the out-of-round contour of the piston rings 5 is transferred manually or by programming into the central processor unit 61. An angular position transmitter 62 is positioned in line with the central processor unit 61 for synchronisation of the angular position of the piston rings 5. In relation to the angular position of the piston rings 5 the central processor unit 61 selects the accompanying value for the work tool and splits the value in a minimum number of $1\mu$ and $5\mu$ steps which are transferred to respective digital-analog converters 63 and 64 and numeric controllers 65 and 66 for actuation of the setting motors 48 and 49 (FIG. 2) or setting motors 20 and 25 (FIG. 3). The single support motions of the setting motors-especially servomotors-48 (20) and 49 (25) are added as shown by the arrow 67 which indicates the $1\mu$ steps and the arrow 68 which indicates the $5\mu$ steps to result in the arrow 69 which indicates the complete motion of the work tool 70.

Additionally it is possible to change the radial dimension of the piston rings 5 by the setting motor-especially step motor-51 shown in FIG. 2. The step motor 51 is controlled by an adaptively controlled servo mechanism 71 positioned in line with the central processor unit 61.

In case of the lathe shown in FIG. 4 it is noted that the setting motors 42 and 43, as well as 42' and 43' are equivalent to the setting motors 20 and 25 arranged in FIG. 3 with the single variation that in each case there are two motors wired with the computer controlled system.

The lathe shown in FIG. 4 is supplied with additional step motors 55 and 55' for rendering possible the separate support motion of the slides 54 and 54'. The step motors 55 and 55' may be controlled in the same manner as the step motor 51 as indicated in FIG. 5 with interrupted lines.

It is pointed out that the setting motors could be constituted by any other electric, pneumatic or hydraulic drive mechanism which can be controlled with a high degree of accuracy. These conditions are expediently met by servomotors.

It is to be understood that the above description of the present invention is susceptible to various modifications, changes and adaptations, and the same are intended to be comprehended within the meaning and range of equivalents of the appended claims.

What is claimed is:

1. In an apparatus for the non-circular peripheral machining of an out-of-round hollow workpiece having outer and inner peripheral faces to be non-circularly machined; the apparatus including a lathe spindle having an axis of rotation, means for clamping the workpiece to the lathe spindle for rotation therewith; a tool holder displaceable transversely to said axis for carrying a tool to engage the outer peripheral face of the workpiece for the external machining thereof; a first and a second setting motor for transversely displacing the tool holder during rotation of the lathe spindle; the improvement comprising means for rotating one of said setting motors in relatively large incremental steps and for rotating the other of said setting motors in relatively small incremental steps; first connecting means coupling the output of said first setting motor with said second setting motor and said tool holder for transversely displacing, with incremental steps, said second setting motor and said tool holder as a unit; second connecting means coupling the output of said second setting motor with said tool holder for transversely displacing, with incremental steps, said tool holder relative to said first connecting means and said first setting motor, whereby the relatively large and the relatively small incremental steps are superposed for transversely displacing said tool holder to an extent which is the combination of the relatively large and relatively small incremental steps; said second connecting means comprising a slide arranged for a transverse displacement with respect to said axis; mounting means for securing said tool holder to said slide; further comprising an additional tool holder for carrying an additional tool for engaging the inner peripheral face of the workpiece for the internal machining thereof; an additional slide arranged on said slide for transverse displacement with respect to said axis and relative to said slide; and a third setting motor mounted on said additional slide and connected to said additional slide for displacing said additional tool holder as a unit transversely to said axis and with respect to said slide.

2. An apparatus as defined in claim 1, said mounting means providing for an adjustability of said tool holder with respect to said slide in the direction of motion of said slide and including releasable locking means for immobilizing said tool holder on and with respect to said slide.

3. In an apparatus for the non-circular peripheral machining of an out-of-round workpiece, including a lathe spindle having an axis of rotation, means for clamping the workpiece to the lathe spindle for rotation therewith; a tool holder displaceable transversely to said axis and carrying a tool to engage a peripheral face of the workpiece; a first and a second setting motor for transversely displacing the tool holder during rotation of the lathe spindle; said setting motors having respective output shafts; the improvement comprising means for rotating one of said setting motors in relatively large incremental steps and for rotating the other of said setting motors in relatively small incremental steps; a first connecting means including a slide arranged for a substantially linear, transverse displacement with respect to said axis; said tool holder including a rocker having rigidly interconnected first and second arms and being pivotally mounted on said slide; said first arm carrying said tool and said second setting motor being mounted on said slide for movement therewith as a unit; the output shaft of said first setting motor being connected with said slide, for displacing, with incremental steps, said slide, said rocker and said second setting motor as a unit; and second connecting means for coupling the output shaft of said second setting motor with said second arm of said rocker for angularly displacing, with incremental steps, said rocker relative to said slide and said first setting motor, whereby the relatively large and the relatively small incremental steps are superposed for radially displacing said tool with respect to said axis to an extent which is the combination of the relatively large and relatively small incremental steps.

4. An apparatus as defined in claim 3, wherein said first and second arms of said rocker are arranged at 90° to one another and the rotary axes of said first and second setting motors are arranged at 90° to one another.

5. An apparatus as defined in claim 3, wherein said output shaft of said second setting motor comprises a threaded spindle; said second connecting means comprising a traveling nut threadedly received on said threaded spindle and mounted on said second arm of said rocker.

6. An apparatus as defined in claim 3, wherein said second connecting means comprises a disc eccentrically affixed to said output shaft of said second setting motor and a sliding block accommodating said disc; said sliding block being arranged for displacement by cam action of the eccentric disc; said sliding block being coupled to said second arm of said rocker.

7. In an apparatus for the non-circular peripheral machining of an out-of-round hollow workpiece having outer and inner peripheral faces to be non-circularly machined; the apparatus including a lathe spindle having an axis of rotation; means for clamping the workpiece to the lathe spindle for rotation therewith; the improvement comprising a first unit assembly for machining the outer peripheral face of the workpiece and a second unit assembly for machining the inner peripheral face of the workpiece; said first and second unit assemblies each including a two-arm rocker having first and second arms, means for pivotally supporting each two-arm rocker, a tool holder mounted on said first arm of each two-arm rocker for carrying a tool to engage a peripheral face of the workpiece, a first and a second setting motor, first connecting means coupling an output of said first setting motor with said second setting motor and said two-arm rocker for displacing, with incremental steps, said second setting motor and said two-arm rocker as a unit transversely to said axis, second connecting means coupling an output of said second setting motor with said second arm of each two-arm rocker for pivoting, with incremental steps, each two-arm rocker relative to said first connecting means and said first setting motor; the apparatus further comprising means for rotating one of said setting motors of each said unit assembly in relatively large incremental steps and for rotating the other of said setting motors of each said unit assembly in relatively small incremental steps, whereby the relatively large and the relatively small incremental steps are superposed within each unit assembly for displacing the tool holder of each unit assembly transversely to said axis to an extent which is the combination of the relatively large and relatively small incremental steps.

8. An apparatus as defined in claim 7, further comprising first and second slides mounted on said apparatus for displacement independently from one another in a direction parallel to the axis of said lathe spindle; said first and said second unit assemblies being mounted, respectively, on said first and second slides for being carried by the respective said slides.

9. An apparatus as defined in claim 8, further comprising separate first and second drive motor means connected to said first and second slides, respectively, for separately displacing said first and second slides.

10. In an apparatus for the non-circular peripheral machining of an out-of-round hollow workpiece, having outer and inner peripheral faces to be non-circularly machined; the apparatus including a lathe spindle having an axis of rotation, means for clamping the workpiece to the lathe spindle for rotation therewith; a tool holder displaceable transversely to said axis for carrying a tool to engage a peripheral face of the workpiece; a first and a second setting motor for transversely displacing the tool holder during rotation of the lathe spindle; the improvement comprising means for rotating one of said setting motors in relatively large incremental steps and for rotating the other of said setting motors in relatively small incremental steps; first connecting means coupling the output of said first setting motor with said second setting motor and said tool holder for transversely displacing, with incremental steps, said second setting motor and said tool holder as a unit; and second connecting means coupling the output of said second setting motor with said tool holder for transversely displacing, with incremental steps, said tool holder relative to said first connecting means and said first setting motor, whereby the relatively large and the relatively small incremental steps are superposed for transversely displacing said tool holder to an extent which is the combination of the relatively large and relatively small incremental steps; a first slide mounted on said apparatus for displacement in a direction parallel to the axis of said lathe spindle; said tool holder, said tool, said first and second setting motors, said means for rotating said first and second setting motors and said first and second connecting means constituting a first unit assembly mounted on said first slide; the tool holder and the tool of said first unit assembly being arranged to machine the outer peripheral face of the workpiece; a second slide mounted on said apparatus for displacement parallel to said axis and independently from said first slide; and a second unit assembly being substantially a duplicate of said first unit assembly and being mounted on said second slide for machining the inner peripheral face of the workpiece.

11. An apparatus as defined in claim 7, 1, 3 or 10, wherein the incremental steps of said first setting motor are of relatively large magnitude to effect a coarse transverse displacement of said tool holder with respect to said axis and the incremental steps of said second setting motor are of relatively small magnitude to effect a fine transverse displacement of said tool holder with respect to said axis.

* * * * *